US007268609B2

(12) United States Patent
van Staveren et al.

(10) Patent No.: US 7,268,609 B2
(45) Date of Patent: Sep. 11, 2007

(54) LOGARITHMIC DETECTOR OR LOGARITHMIC AMPLIFIER HAVING CHOPPER STABILIZED LOGARITHMIC INTERCEPT

(75) Inventors: Arie van Staveren, Hazerswoude-dorp (NL); Michael Hendrikus Laurentius Kouwenhoven, Zoetermeer (NL)

(73) Assignee: National Semiconductor Corporation, Santa Clara, CA (US)

( * ) Notice: Subject to any disclaimer, the term of this patent is extended or adjusted under 35 U.S.C. 154(b) by 43 days.

(21) Appl. No.: 11/336,080

(22) Filed: Jan. 20, 2006

(65) Prior Publication Data

US 2007/0170972 A1 Jul. 26, 2007

(51) Int. Cl.
*G06F 7/556* (2006.01)

(52) U.S. Cl. ........................ 327/350; 327/351; 327/352

(58) Field of Classification Search ................ 327/350, 327/351, 352

See application file for complete search history.

(56) References Cited

U.S. PATENT DOCUMENTS 4,990,803 A 2/1991 Gilbert ........................ 327/351
5,345,185 A 9/1994 Gilbert ........................ 327/350
5,451,895 A * 9/1995 Lim ........................ 327/351
5,570,055 A 10/1996 Gilbert ........................ 327/350

OTHER PUBLICATIONS

"Limiting-Logarithmic Amplifiers" Author Barrie Gilbert, Analog Devices Beaverton, OR Electronics Laboratories Advanced Engineering Course on RF IC Design for Wireless Communication Systems. Lausaane Switzerland Jul. 3-7, 1995.

* cited by examiner

*Primary Examiner*—Kenneth B. Wells

(57) ABSTRACT

One embodiment of the present invention is directed to an apparatus for reducing errors affecting the intercept of a logarithmic device, the apparatus including a first switching device coupled to an input of the logarithmic device. The first switching device for switches the input of the logarithmic device between an input signal and a reference signal. The apparatus further includes a polarity switching device coupled to an output of the logarithmic device. The polarity switching device is configured to switch the polarity of an output signal of the logarithmic device when the logarithmic device is receiving one of the input signal and the reference signal. The apparatus further includes a low pass filter coupled to the polarity switching device.

24 Claims, 4 Drawing Sheets

LOGARITHMIC DETECTOR OR LOGARITHMIC AMPLIFIER HAVING CHOPPER STABILIZED LOGARITHMIC INTERCEPT

BACKGROUND

1. Field

The present invention generally relates to the field of logarithmic amplifiers and detectors.

2. Background

Logarithmic amplifiers are useful wherever a signal of large dynamic range must be reduced to one of substantially smaller dynamic range, and where equal ratios in the input domain must be transformed to equal increments in the output domain. In communications and instrumentation applications, this has the value that the output represents the input expressed in decibel form.

Equation 1 represents the general transfer characteristic of a logarithmic amplifier.

$$V_{out} = V_0 \log\left(\frac{V_{in}}{V_z}\right) \tag{1}$$

In this equation, $V_0$ represents the slope and $V_z$ represents the intercept voltage (i.e., the input voltage for which the output voltage is zero). This is, of course, a highly non-linear conversion, with consequences which may be unexpected if the peculiar nature of the log transformation is not kept clearly in mind. Thus, while an attenuator inserted in front of a linear amplifier would change the slope at the output, it would not affect the slope of the output of a log-amp; similarly, an offset voltage at the output of a linear amplifier has no relevance to the amplitude of an AC signal, while an offset added to the output of a log-amp alters the apparent magnitude of its input.

It should be appreciated that the accuracy of a logarithmic amplifier relies heavily on the stabilization of the parameters $V_0$ (slope) and $V_z$ (intercept). Slope can be made stable over process by means of accurate design. In bipolar technology, the intercept is commonly proportional to absolute temperature (PTAT). As a consequence, it is more difficult to stabilize over process and temperature by accurate design, and generates the amplifier temperature error:

$$V_{out,error} = -V_0 \log\left(\frac{T}{T_0}\right) \tag{2}$$

For the temperature range of −50 C<T<100 C this is equivalent to an input error of −2.5 dB<input reference error<2 dB. The relationship described in Equation 2 holds for LOG-amplifiers and detectors implemented with bipolar transistors. For CMOS or other technologies, different relations may hold. Regardless, the key problem with the intercept is still the same: the intercept is generally temperature dependent and sensitive to device mismatch/offset, frequency dependencies of the amplifiers, etc.

Previous attempts have been made to correct the temperature dependent intercept voltage. One approach has been to utilize input correction to make $V_{in}$ PTAT. This has been implemented through, by way of examples, a resistive divider with a PTAT transfer or an amplifier with a PTAT transfer. Circuits employing this approach were capable of making the log conformance temperature independent, but these circuits also needed to cope with the full bandwidth of the circuit.

Yet another approach has dealt with output compensation (e.g., adding a correction voltage or current at the output of the log-amp). However, this approach is not exact and results in a temperature dependent log-conformance error. Furthermore, the correction voltage/current is dependent on log $$\left(\frac{T}{T_0}\right),$$

and accurate compensation requires the LOG-slope to be accurately known. In practice, this parameter is also subject to small part-to-part variations (and variations over other operating conditions as temperature, frequency, etc.).

Thus, prior approaches to the problem of logarithmic amplifier intercept stabilization have not produced an overall technique that is applicable irrespective of the structure and error contributions in the individual sections.

SUMMARY

One embodiment of the present invention is directed to an apparatus for reducing errors affecting the intercept of a logarithmic device, the apparatus including a first switching device coupled to an input of the logarithmic device. The first switching device for switching the input of the logarithmic device between an input signal and a reference signal. The apparatus further includes a polarity switching device coupled to an output of the logarithmic device. The polarity switching device is configured to switch the polarity of an output signal of the logarithmic device when the logarithmic device is receiving one of the input signal and the reference signal. The apparatus further includes a low pass filter coupled to the polarity switching device.

Thus, the resulting output of the apparatus is completely independent of any input gain error or output offset of the logarithmic device. Furthermore, the device parameter dependent LOG-intercept is eliminated from the transfer and replaced by the stable reference voltage, which is a fixed value over time or periodic signal with a fixed/stable amplitude.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Briefly stated, embodiments of the present invention are directed to a method and apparatus for reducing errors affecting the intercept of a logarithmic device such as a logarithmic amplifier or a logarithmic detector. Errors that affect the intercept voltage of a logarithmic amplifier can generically be modeled as either an input gain error (δ) or an output offset ($V_{os}$). These errors can be introduced as a result of some temperature dependency of the circuit, component mismatch, etc. Thus, a logarithmic amplifier having no error compensation circuitry would produce the following output:

$$V_{out} = V_0 \log\left(\frac{V_{in}}{V_z(1+\delta)}\right) + V_{os} \quad (3)$$

It is appreciated that the input gain error (δ) is translated to an output offset of $V_0$ log(1+δ). However, in order to determine the relationship between an input gain error and the corresponding offset error observed at the output, it is necessary to apply a reference voltage to the input of the logarithmic device. Once the reference signal has been applied to the input, the corresponding offset error can be subsequently cancelled by chopping.

Figure 1:
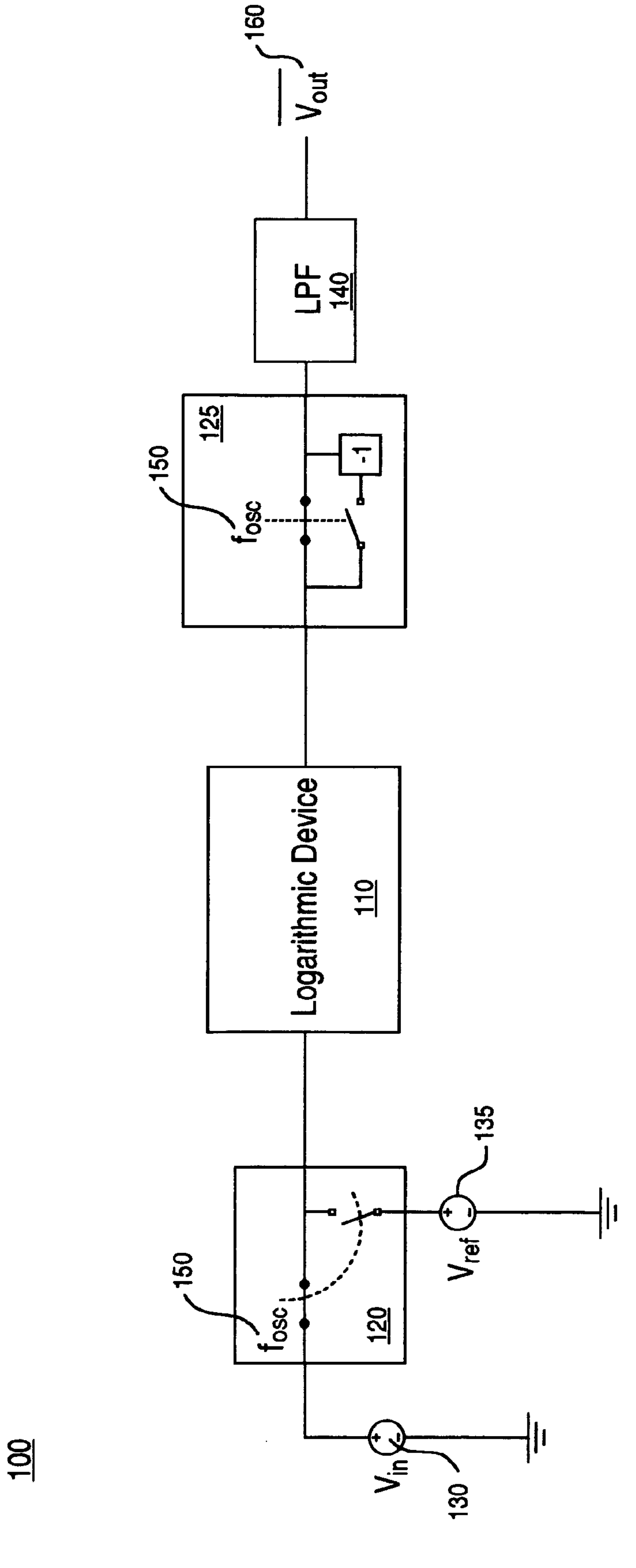
FIG. 1 shows a general diagram of an apparatus, in accordance with an embodiment of the present invention.

One embodiment of the present invention is directed to an apparatus for reducing errors affecting the intercept of a logarithmic device such as a logarithmic amplifier or a logarithmic detector. FIG. 1 shows a general diagram of an apparatus 100, in accordance with an embodiment of the present invention. Apparatus 100 includes logarithmic device 110. In one embodiment, logarithmic device is a logarithmic amplifier. In another embodiment, logarithmic device is a logarithmic detector. Apparatus 100 also includes a first switching device 120 for switching the input of logarithmic device 10 between an input signal 130 and a reference signal 135. It should be appreciated that while input signal 130 and reference signal 135 are depicted as voltages, they may also be currents. In one embodiment, the first switching device 120 is controlled by a control pulse. In the embodiment depicted in FIG. 1, logarithmic device 110 receives an alternating input of $V_{in}$ and $V_{ref}$. Stated alternatively, logarithmic device 110 experiences two states: State 1 corresponding to $V_{in}$ and State 2 corresponding to $V_{ref}$. In one embodiment, the outputs of logarithmic device 110 during State 1 and State 2 respectively are expressed as:

$$v_{OUT1} = V_0 \log\left(\frac{V_{in}}{V_z(1+\delta)}\right) + V_{os} \quad (4)$$

$$v_{OUT2} = V_0\left(\frac{V_{ref}}{V_z(1+\delta)}\right) + V_{os} \quad (5)$$

In one embodiment, a polarity switching device 125 is coupled to an output of the logarithmic device 110. In one embodiment, the polarity switching device 125 is a commutator. Polarity switching device 125 is configured to switch the polarity of the output signal of logarithmic device 110. Polarity switching device 125 is controlled by control pulse 150 such that it reverses the polarity of the output signal of logarithmic device 110 when logarithmic device 110 is receiving $V_{ref}$ at its input.

Figure 2:
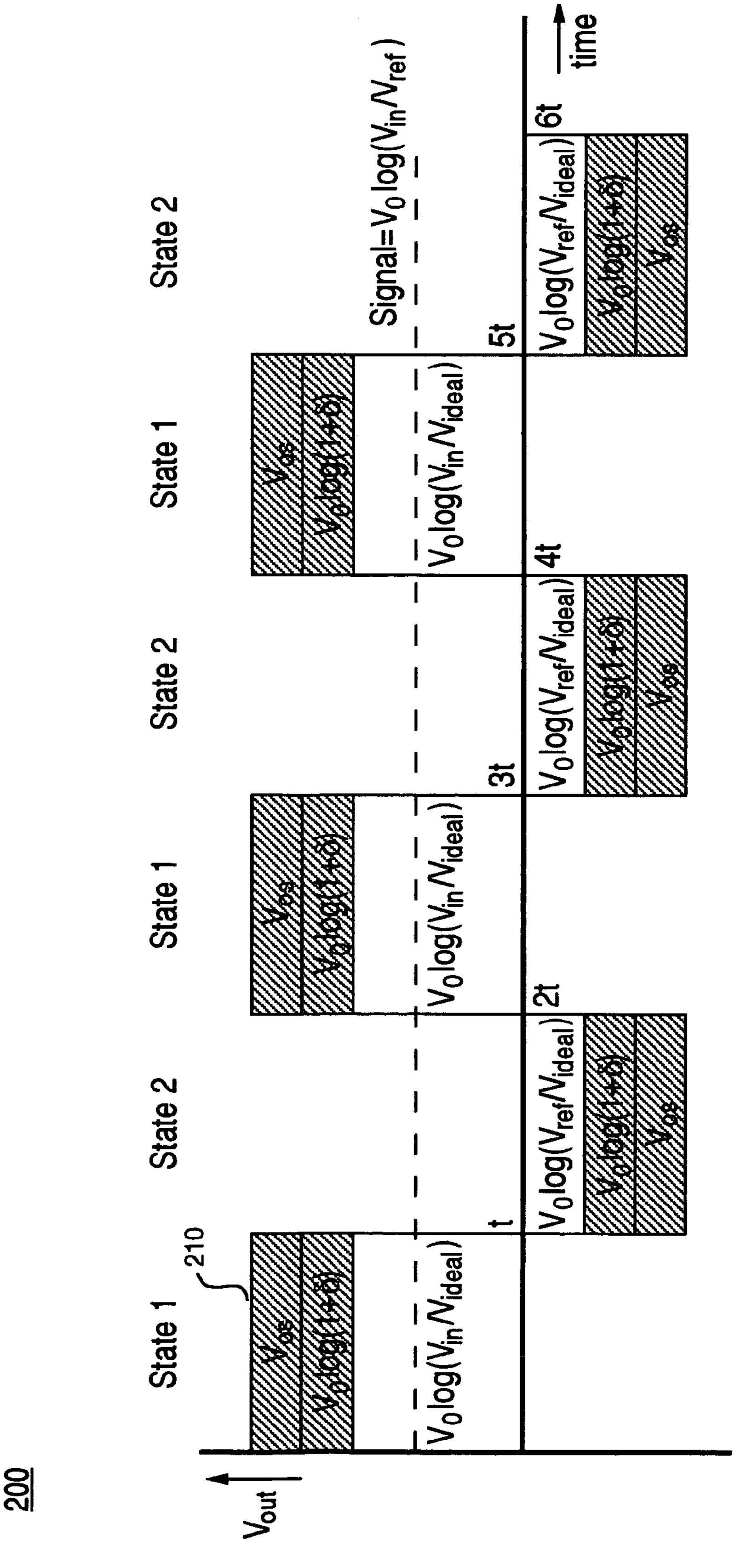
FIG. 2 illustrates a graphical representation of a signal observed at one stage of an embodiment of the present invention.

Apparatus 100 also includes low-pass filter 140 coupled to polarity switching device 125. Low-pass filter 140 will remove high-frequency components from its input signal. In case of a detector, the remaining DC value is the intended output signal. In case of a logarithmic amplifier, the signal can be AC with a relatively low frequency (lower than the chopper frequency). FIG. 2 illustrates a graphical representation of the signal observed at the input of low-pass filter 140. Note that both State 1 and State 2 signals contain $V_{os}$ and $V_0$ log(1+δ) components that are opposite in sign. In producing the DC equivalent of its input, low-pass filter 140 effectively averages its input signal, which can be simplified to the average of the State 1 signal and the State 2 signal. Thus, the State 1 and State 2 signals are first summed:

$$v_{OUT} = V_0 \log\left(\frac{V_{in}}{V_z(1+\delta)}\right) + V_{os} - V_0 \log\left(\frac{V_{ref}}{V_z(1+\delta)}\right) - V_{os} = V_0 \log\left(\frac{V_{in}}{V_{ref}}\right) \quad (6)$$

Next, the signal is divided in half as a result of the averaging process, leaving the output of low-pass filter 140 to be:

$$\overline{v_{OUT}} = \frac{1}{2} V_0 \log\left(\frac{V_{in}}{V_{ref}}\right) \quad (7)$$

It should be appreciated that the division by 2 is not a deliberate operation; it is due the chopping—each signal is available at the device output for 50% of time only (with 50% duty cycle).

Thus, the resulting output of apparatus 100 is completely independent of any input gain error (δ) or output offset ($V_{os}$). Furthermore, the device parameter dependent LOG-intercept ($V_z$) is eliminated from the transfer and replaced by the stable reference voltage $V_{ref}$.

Figure 3:
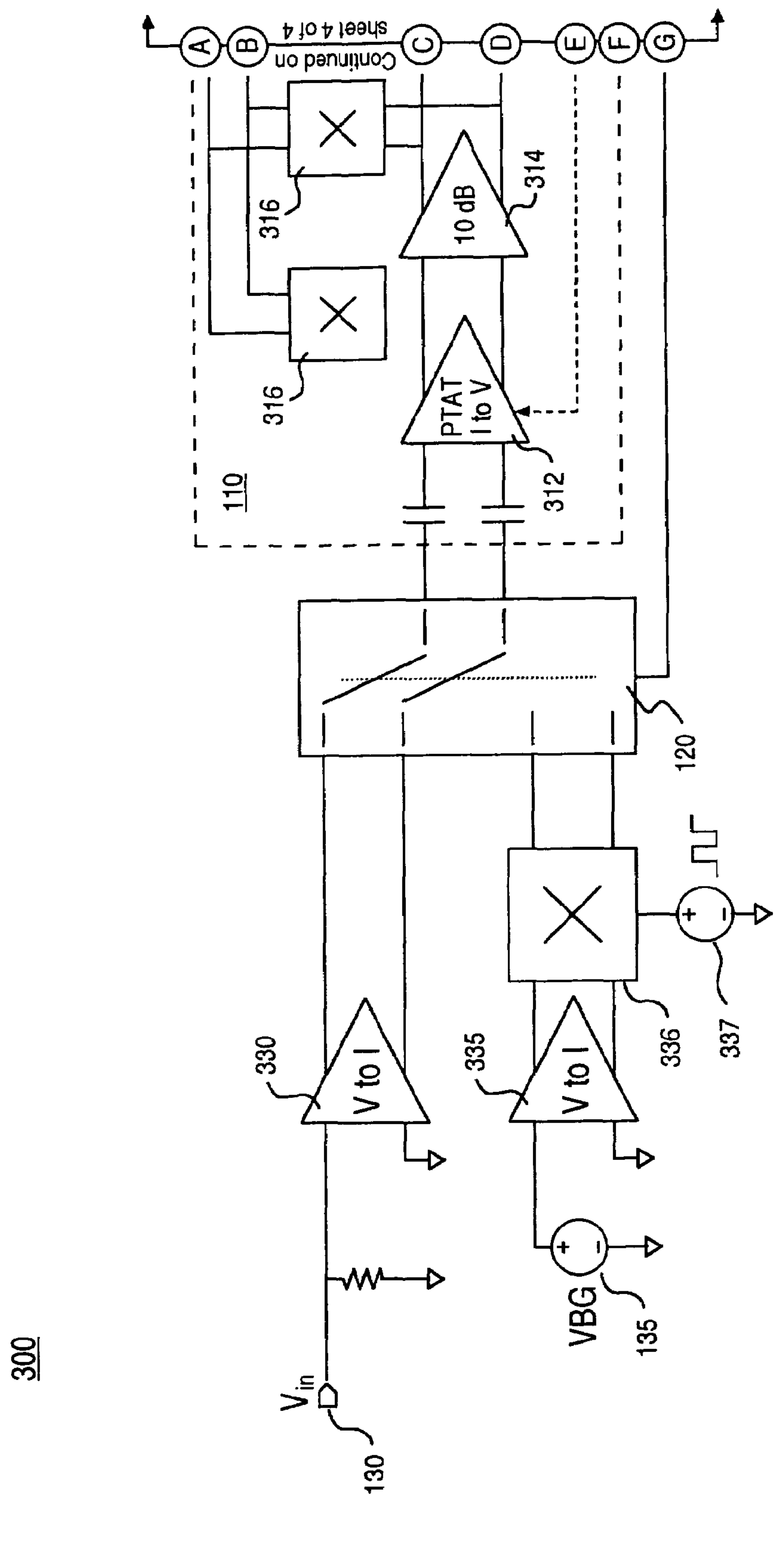
FIG. 3 illustrates a detailed schematic of an apparatus, in accordance with an embodiment of the present invention.
Figure 3:
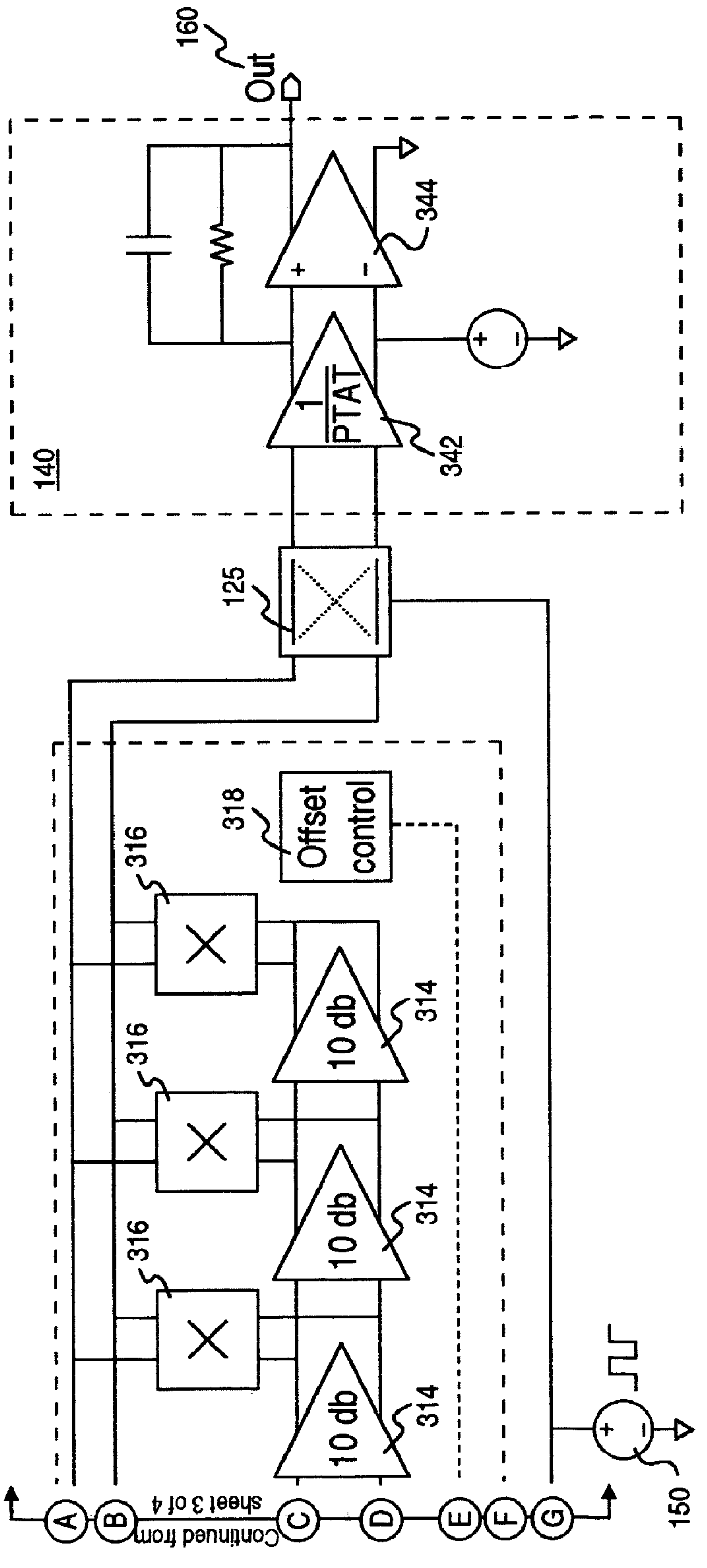

FIG. 3 illustrates a preferred embodiment of the present invention. Apparatus 300 includes logarithmic device 110. In this embodiment, logarithmic device 110 is a logarithmic detector. Logarithmic device 110 includes PTAT current-to-voltage converter 312. PTAT current-to-voltage converter 312 is then coupled to a cascade of stages, with each stage including a gain section 314 and a transconductor 316. In a LOG-detector this transconductor is an amplitude or RMS/MS (Root Mean Square/Mean Square) detector. The number of stages used depends on the required input range (dB) for a particular application. Logarithmic device 110 also includes offset controller 318 coupled between the last stage and the PTAT current to voltage converter 312.

In a preferred embodiment, apparatus 300 also includes a first switching device 120 for switching the input of logarithmic device 110 between an input signal 130 and a reference signal 135. The first switching device 120 is controlled by control pulse 150. The frequency of control pulse 150 should be higher than the highest frequency of interest in the LOG-amp/detector output signal in response to the device input signal. Further, the frequency of control pulse 150 should be such that the sum of the control pulse frequency and the highest frequency of interest in the input signal is lower than the highest frequency that the LOG-amplifier/detector can reliably process. This criterion also holds for the sum of the control pulse frequency and the frequency of the stable reference signal. In practice, the control pulse frequency will be chosen several decades above the highest intended LOG-amp/detector output signal. This allows for effective removal of unintended output signal components at the control pulse frequencies (e.g. the DC output offset of the LOG-amp/detector is converted to this frequency by the output commuter/polarity switch), but not higher than the control pulse frequency.

In one embodiment, reference signal 135 is a bandgap reference voltage. Reference voltage 135 is converted into a reference current by voltage-to-current converter 335. The reference current is then converted into a reference pulse by a DC-to-AC converter. In one embodiment, the DC-to-AC converter includes commutator 336, which is controlled by pulse generator 337 and coupled between voltage-to-current converter 335 and first switching device 120. In one embodiment, input signal 130 is also converted from a voltage to a current by voltage-to-current converter 330. In the preferred embodiment depicted in FIG. 3, logarithmic device 110 receives an alternating input of signals derived from $V_{in}$ and $V_{ref}$. Stated alternatively, logarithmic device 110 experiences two states: State 1 corresponding to $V_{in}$ and State 2 corresponding to $V_{ref}$.

In a preferred embodiment, a polarity switching device 125 is coupled to an output of the logarithmic device 110. In one embodiment, the polarity switching device 125 is a commutator. Polarity switching device 125 is configured to switch the polarity of the output signal of logarithmic device 110. In one embodiment, polarity switching device 125 is controlled by control pulse 150 such that it reverses the polarity of the output signal of logarithmic device 110 when logarithmic device 110 is receiving the signal derived from $V_{ref}$ at its input.

Apparatus 300 also includes low-pass filter 140 coupled to polarity switching device 125. In a preferred embodiment, low-pass filter 140 includes a PTAT amplifier coupled to the polarity switching device and a feedback amplifier coupled to the PTAT amplifier. In one embodiment, the feedback amplifier will convert the current received to a voltage and average the signal received from the PTAT amplifier. In other words, low-pass filter 140 will output the DC equivalent of the signal observed at its input. The output of low-pass filter 140 will be that of Equation 7. The filter should pass the highest intended output signal frequency of interest in the LOG-amp/detector output signal (in response to the input signal), but suppress frequency components introduced by the chopper/polarity switch and possibly the periodic reference signal.

Thus, embodiments of the present invention provide an overall approach that is applicable irrespective of the structure and error contributions in the individual sections; they only process the input and output signal of the entire logarithmic device and require no knowledge of the precise temperature and device dependence of the errors. Embodiments achieve higher overall accuracy, especially with respect to temperature drift. Embodiments enable the correction of errors in logarithmic devices without the need to accurately reproduce and/or compensate individual error effects. This makes log-amplifier and log-detector design far less technology dependent and potentially allows migration from traditional bipolar to CMOS or other technologies.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for reducing errors affecting the intercept of a logarithmic device, the apparatus comprising:

a first switching device coupled to an input of the logarithmic device, the first switching device for switching the input of the logarithmic device between an input signal and a reference signal;

a polarity switching device coupled to an output of the logarithmic device, the polarity switching device configured to switch the polarity of an output signal of the logarithmic device when the logarithmic device is receiving one of the input signal and the reference signal; and a low pass filter coupled to the polarity switching device.

2. The apparatus as recited in claim 1 wherein the reference signal is derived from a bandgap reference.

3. The apparatus as recited in claim 1 wherein the reference signal comprises a periodic signal with a stable amplitude.

4. The apparatus as recited in claim 1 wherein the reference signal comprises a reference voltage and the apparatus further comprises a voltage-to-current converter coupled between the reference voltage and the first switching device, wherein the voltage-to-current converter generates a reference current.

5. The apparatus as recited in claim 4 further comprising a DC-to-AC converter for converting the reference current to a reference pulse.

6. The apparatus as recited in claim 5 wherein the DC-to-AC converter comprises a commutator coupled between the voltage-to-current converter and the first switching device, wherein the commutator is controlled by a pulse generator.

7. The apparatus as recited in claim 1 further comprising a voltage-to-current converter that receives the input signal, converts the input signal to an input current, and outputs the input current to the first switching device.

8. The apparatus as recited in claim 1 wherein the first switching device is controlled by a control signal.

9. The apparatus as recited in claim 8 wherein the polarity switching device is controlled by the control signal.

10. The apparatus as recited in claim 1 wherein the polarity switching device comprises a commutator.

11. The apparatus as recited in claim 1 wherein the polarity switching device is controlled by a control signal.

12. The apparatus as recited in claim 1 wherein the logarithmic device comprises:

a PTAT current to voltage converter coupled to the first switching device;

a number of stages coupled between the PTAT current to voltage converter and the polarity switching device, wherein each stage comprises a gain stage and a transconductor; and an offset controller coupled between the last stage and the PTAT current to voltage converter.

13. The apparatus as recited in claim 12 wherein the transconductor comprises an amplitude detector.

14. The apparatus as recited in claim 12 wherein the transconductor comprises a Root Mean Square/Mean Square detector.

15. The apparatus as recited in claim 1 wherein the low-pass filter comprises:

a PTAT amplifier coupled to the polarity switching device; and a feedback amplifier coupled to the PTAT amplifier, the feedback amplifier for converting current to voltage and averaging the signal received from the PTAT amplifier.

16. A method for reducing errors affecting the intercept of a logarithmic device, the method comprising:

switching an input of the logarithmic device between an input signal and a reference signal;

switching an output signal of the logarithmic device between a first transmission line and a second transmission line, wherein the output signal of the logarithmic device passes through the first transmission line when the logarithmic device is receiving the input signal, wherein further the output signal of the logarithmic device passes through the second transmission line when the logarithmic device is receiving the reference signal, wherein the polarity of the first transmission line is the opposite of the polarity of the second transmission line; and averaging the signals on the first transmission line and the second transmission line.

17. The method as recited in claim 16 wherein the reference signal is derived from a bandgap reference.

18. The method as recited in claim 16 wherein the reference signal comprises a periodic signal with a stable amplitude.

19. The method as recited in claim 16 wherein the reference signal comprises a reference voltage and the method further comprises converting the reference voltage to a reference current.

20. The method as recited in claim 19 further comprising converting the reference current from a DC signal to an AC pulse.

21. The method as recited in claim 16 further comprising converting the input signal from a voltage to an input current.

22. The method as recited in claim 16 further comprising controlling the switching of the input of the logarithmic device with a control signal.

23. The method as recited in claim 22 further comprising controlling the switching of the output of the logarithmic device with the control signal.

24. The method as recited in claim 16 further comprising controlling the switching of the output of the logarithmic device with a control signal.

* * * * *